(No Model.)
C. S. GUILKEY.
CULTIVATOR.
No. 359,535. Patented Mar. 15, 1887.
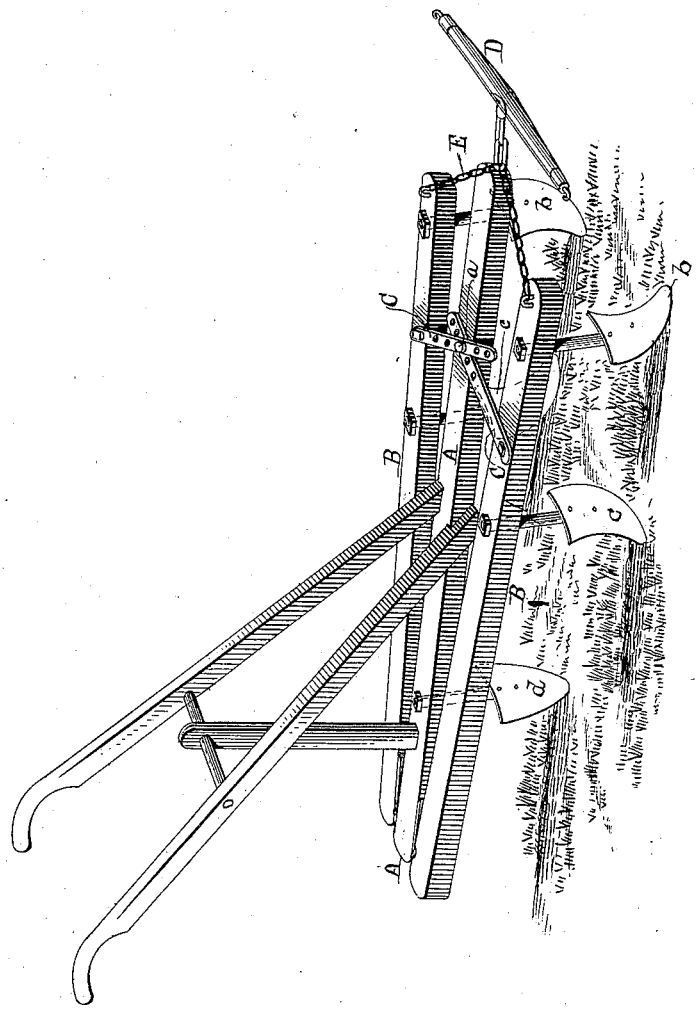
Witnesses.
C. H. Freeman
Alonzo Mims.
C. S. Guilkey
Inventor.

UNITED STATES PATENT OFFICE.

CHARLES S. GUILKEY, OF CATLETTSBURG, KENTUCKY.

CULTIVATOR.

SPECIFICATION forming part of Letters Patent No. 359,535, dated March 15, 1887.

Application filed February 9, 1886. Serial No. 191,371. (No model.)

*To all whom it may concern:*

Be it known that I, CHARLES S. GUILKEY, of Catlettsburg, in the county of Boyd and State of Kentucky, have invented a new and Improved Cultivator, of which the following is a specification.

The cultivator is illustrated in the accompanying drawing, which shows a perspective view of the same.

The frame of the cultivator consists of a center beam, A, and two side beams, B B, which are hinged at their rear ends to the center beam. The side beams are adjustable to and from the center beam, and are held in the desired position by means of adjusting-bars C C, which are pivoted to the side beams and secured to the center beam by a bolt, $a$, which is passed through one series of apertures in the adjusting-bars. The whiffletree D, by which the cultivator is drawn, is attached to the center of a draft-chain, E, which is secured at opposite ends to the side beams, B B.

The cultivator is constructed and adapted to be used between rows of the plants to be cultivated, and the wide end of the machine is the forward end. Each side beam has at or near its forward end a throwing-off or scraping shovel, $b$, and at or near its center a hilling-shovel, $c$. The scrapers $b$ $b$ travel nearest the plants and scrape the earth close to them and throw it toward the center. The hillers $c$ $c$, which are further from the plants, take up the earth which has been thrown toward the center by the scrapers and deposit it near the plants. The center beam is provided at or near its rear end with a furrow or ditching shovel, $d$. This shovel makes a furrow between the rows of plants, which acts as a drain.

The shovels carried by the side beams are attached so as to act as scrapers and hillers, by turning the forward shovels toward the center and the rear shovels toward the outside. The ditching-shovel $d$ is arranged with its breadth at right angles to the line of draft.

I claim as my invention—

1. The combination, in a cultivator, of the center beam, A, having a shovel at its rear end, the rear hinged adjustable side beams, B, each carrying a scraper and hiller, and the adjusting-bars C C, substantially as set forth.

2. The combination, in a cultivator, of the center beam, A, having a shovel at its rear end, the rear hinged side beams, B, each carrying a scraper and hiller, the adjusting-bars C C, and the draft-chain E, substantially as set forth.

In testimony whereof I affix my signature in presence of two witnesses.

CHARLES S. GUILKEY.

Witnesses:
JNO. N. HAMILTON,
N. P. ANDREWS.